No. 830,492. PATENTED SEPT. 11, 1906.
E. L. COLE.
PASTRY PIE GUARD.
APPLICATION FILED MAY 16, 1905.
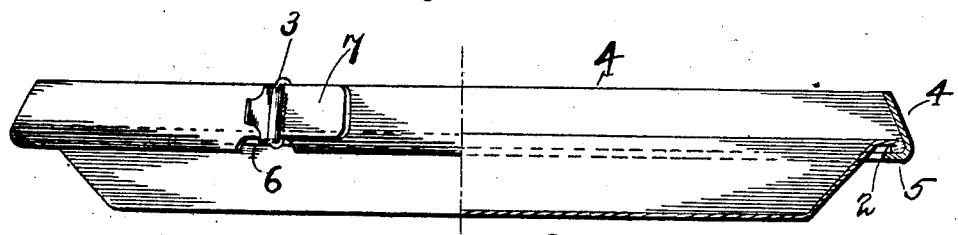
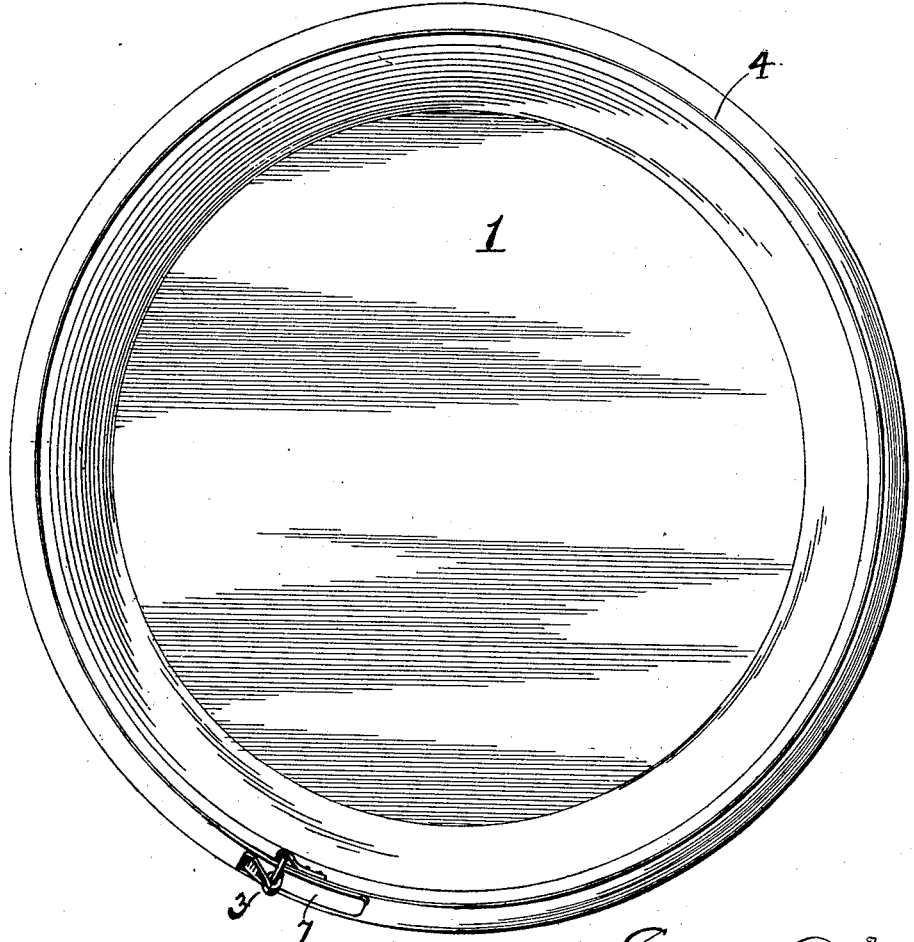
Witnesses
Chas. K. Davies.
L. O. Langworthy.
Inventor
Emma L. Cole
By Watson E. Coleman
Attorney
THE NORRIS PETERS CO., WASHINGTON, D. C.

UNITED STATES PATENT OFFICE.

EMMA L. COLE, OF SMITHFIELD, WEST VIRGINIA.

PASTRY-PIE GUARD.

No. 830,492. Specification of Letters Patent. Patented Sept. 11, 1906.

Application filed May 16, 1905. Serial No. 260,637.

*To all whom it may concern:*

Be it known that I, EMMA L. COLE, a citizen of the United States, residing at Smithfield, in the county of Wetzel and State of West Virginia, have invented certain new and useful Improvements in Pastry - Pie Guards, of which the following is a specification, reference being had therein to the accompanying drawings.

My invention relates to pastry-pie guards, and more particularly to that class adapted to be removably attached to the ordinary tin pie-plate now commonly used in baking pastry pies, and whereby the juice is prevented from running out of the edge of the pie while it is baking.

A further object of the invention is to provide a device of the character described which shall be simple and inexpensive in construction, effective, and susceptible and easy of adjustment to different-sized pie-plates, and which will effectually prevent the edges of the crust from burning or drying too quickly, causing them to spring apart and allow the juice to escape.

Other objects and advantages of my invention, as well as the structural features by means of which these objects are attained, will be made clear by an examination of the specification, taken in connection with the accompanying drawings, in which the same reference - numerals indicate corresponding portions throughout, and in which—

Figure 1 is a side elevation, partly in section, showing my device attached to an ordinary tin pie-plate; and Fig. 2 is a top plan of a pie-plate, showing my device in position thereon.

My device consists of a single circular strip of asbestos or any other desirable non-inflammable material made to conform to the shape and contour of an ordinary pie-baking plate or tin 1 by extending around the upper edge 2 thereof and being held in place by a buckle 3, secured to one end thereof. 4 designates the upper edge of the strip of which my device is constructed and which is turned inward at an angle with the outward edge of said pie-plate to overhang the same, thus forming a protection from the heat from the top oven-plate. This strip at the lower end is bent horizontally to form a circular flange 5, which rests against the under edge 4, being bent sufficiently over the rim to rest thereon, as best shown in Fig. 1. In order that my device may be securely attached to a pie-baking tin or plate in such manner that the juice may not escape at the point of connection of the two ends, it is necessary for the under part to be cut away, as shown at 6, leaving an extending strap 7 of the exact width of the buckle 3. This arrangement of parts permits the circular strip of asbestos to be drawn tightly around the outer edge of the pie plate or tin, and also comprises a means whereby said device may be adjustably and removably secured to any-size plate.

In operation the pie is first placed in the pan preparatory to baking and the edges trimmed, after which my device is placed around the top rim of the pan and secured in position by means of the buckle, the noninflammable material of which the device is constructed preventing the same from being injured by the heat.

Having thus described my said invention, what I claim as new, and desire to secure by Letters Patent of the United States, is—

A combination of a pie-plate having an outwardly-directed rim, and a guard-ring underlying the rim and having an annular flange rising from the periphery of the ring and inclined inwardly to overhang the rim of the plate.

In testimony whereof I hereunto affix my signature in presence of two witnesses.

EMMA L. COLE.

Witnesses:
PHALEN MORRIS,
AMNIE COLE.